United States Patent
Zimmermann et al.

(10) Patent No.: US 7,496,368 B2
(45) Date of Patent: Feb. 24, 2009

(54) METHOD AND DEVICE FOR CONTROLLING FREQUENCY SELECTION WITHIN A WIRELESS COMMUNICATION SYSTEM

(75) Inventors: Gerd Zimmermann, Eckental (DE); Mathias Pauli, Nürnberg (DE); Peter Schramm, Eching (DE); Jamshid Khun-Jush, Nürnberg (DE); Lennart Gafvels, Solna (DE); Göran Malmgren, Huddinge (DE)

(73) Assignee: Sharp Kabushiki Kaisha, Osaka (JP)

( * ) Notice: Subject to any disclaimer, the term of this patent is extended or adjusted under 35 U.S.C. 154(b) by 138 days.

(21) Appl. No.: 10/674,791

(22) Filed: Oct. 1, 2003

(65) Prior Publication Data

US 2005/0192016 A1    Sep. 1, 2005

Related U.S. Application Data

(63) Continuation of application No. PCT/EP02/03578, filed on Mar. 28, 2002.

(30) Foreign Application Priority Data

Apr. 3, 2001    (EP) .................................. 01108397

(51) Int. Cl.
  *H04Q 7/20*    (2006.01)
(52) U.S. Cl. ...................... 455/455; 455/63.1
(58) Field of Classification Search ............... 455/450, 455/423, 561, 63, 528, 455, 63.1; 370/252, 370/455, 345; 375/346
  See application file for complete search history.

(56) References Cited

U.S. PATENT DOCUMENTS

| | | | |
|---|---|---|---|
| 6,052,605 A * | 4/2000 | Meredith et al. .............. 455/561 |
| 6,400,305 B1 * | 6/2002 | Kuhn ........................... 342/20 |
| 6,404,830 B2 * | 6/2002 | Wiese et al. ................. 375/346 |
| 6,466,793 B1 * | 10/2002 | Wallstedt et al. ............ 455/450 |
| 6,697,013 B2 * | 2/2004 | McFarland et al. .......... 342/159 |
| 6,912,204 B2 * | 6/2005 | Kossi et al. .................. 370/252 |
| 2001/0039183 A1 * | 11/2001 | Kobayashi et al. ........... 455/63 |

(Continued)

FOREIGN PATENT DOCUMENTS

JP    6-37762 A    2/1994

(Continued)

OTHER PUBLICATIONS

Kerry et al., "Liaison statement on the compatibility between IEEE 802.11a and radars in the Radiolocation and Radionavigation service in the 5250-5350 MHz and 5470-5725 MHz bands", IEEE 802 Ad-Hoc Regulatory, Online Jan. 17, 2001, pp. 1-6.

(Continued)

*Primary Examiner*—Duc Nguyen
*Assistant Examiner*—Wayne Cai
(74) *Attorney, Agent, or Firm*—Nixon & Vanderhye, P.C.

(57) ABSTRACT

The invention relates to a method and a device for controlling frequency selection within a wireless communication system in response to radar-like interference signals. The method comprises continuously or quasi-continuously monitoring and assessing a plurality of frequencies with respect to a radar-like interference signal and allocating a quality parameter to each assessed frequency, the quality parameter indicating the probability that the frequency is occupied. The method further comprises selecting one or more frequencies in dependence on the allocated quality parameters and subsequent frequency monitoring.

28 Claims, 7 Drawing Sheets

U.S. PATENT DOCUMENTS

| | | | | |
|---|---|---|---|---|
| 2002/0160769 | A1* | 10/2002 | Gray | 455/423 |
| 2004/0033789 | A1* | 2/2004 | Tsien | 455/130 |
| 2004/0147580 | A1* | 7/2004 | Burgess et al. | 514/406 |
| 2005/0043047 | A1* | 2/2005 | Vigier et al. | 455/509 |

FOREIGN PATENT DOCUMENTS

| | | |
|---|---|---|
| WO | WO 96/27267 | 9/1996 |
| WO | WO 98/59435 | 12/1998 |

OTHER PUBLICATIONS

Grace et al., "Comparison of a Distributed Dynamic Channel Assignment Scheme with Multichannel CSMA in a Terrestrial Radio Environment", IEE Proceedings: Communications, Institution of Electrical Engineers, GB, vol. 146, No. 3, Jun. 1999, pp. 191-195.

Akerberg et al., "On Channel Definitions and Rules for Continuous Dynamic Channel Selection in Coexistence Etiquettes for Radio Systems", Proceedings of IEEE Vehicular Technology Conference, Stockholm, Sweden, Jun. 8-10, 1994, pp. 809-813.

Japanese Office Action mailed Nov. 16, 2007 in corresponding Japanese application 2002-580665.

* cited by examiner

METHOD AND DEVICE FOR CONTROLLING FREQUENCY SELECTION WITHIN A WIRELESS COMMUNICATION SYSTEM

This is a continuation application of international application PCT/EP02/03578, filed Mar. 28, 2002, which designated the U.S.

BACKGROUND OF THE INVENTION

1. Technical Field

The present invention relates to the field of controlling a wireless communication system like a WLAN or HIPERLAN/2 system and in particular to a method and a device for controlling frequency selection within a wireless communication system in response to radar-like interference signals.

2. Related Art and Other Considerations

The expression HIPERLAN stands for High Performance Radio Local Area Network. HIPERLAN/2 (H/2) is a standard for high speed radio communication with typical data rates up to 54 Mbit/s.

A H/2 network consists typically of a number of access points (AP). Each AP covers a certain geographic area. Together the APs form a radio access network with full or partial coverage of an area of almost any size. Each AP serves a number of mobile terminals (MT) which are associated to it. In the case where the quality of the radio link degrades to an unacceptable level, the MT may move to another AP by performing a handover.

Another operational mode is used to operate H/2 as an adhoc network without relying on a cellular network infrastructure. In this case a central control (CC), which is dynamically selected among the MTs, provides the same support as a fixed AP.

H/2 systems are intended to be operated in the 5 GHz frequency range. The nominal carrier frequencies of H/2 are allocated in two frequency bands. In the following, the frequency band between 5150 MHz and 5350 MHz will be called the lower frequency band and the frequency band between 5470 MHz and 5720 MHz will be called the upper frequency band. The nominal carrier frequencies within each frequency band are spaced 20 MHz apart.

H/2 systems and other wireless communications systems require dynamic frequency adaption—also called Dynamic Frequency Selection (DFS)—to local interference conditions. The task of DFS is to detect interference from other system in order to avoid co-channel operation with these systems. A possible realization of DFS is to periodically measure the interference on all used and not used frequencies and to control the frequency selection in accordance with the measurement. Thus, when for example a currently used frequency is suddenly disturbed by interference, a new frequency may automatically be selected which is less interfered than the frequency currently in use.

Possible solutions for DFS in wireless communications systems are periodically accomplished measurements during the normal mode of operation. In order to keep the transmission capacity high, measurements should only rarely be accomplished, e.g. a measurement takes place every few seconds. However, under certain circumstances such a measurement strategy does not work satisfactorily because of the following reasons.

H/2 systems for example must be able to share the upper frequency band and parts of the lower frequency band with radar systems, some of which are mobile. Typical radar systems use rotating antennas with a small main lobe of approximately 1° for horizontal scanning. Consequently, radar interferences are difficult to detect with DFS measurement strategies. This situation is depicted in FIG. 1, where $W_R$ and $W_H$ denote the interval length of a radar signal and a H/2 DFS measurement, $T_R$ and $T_H$ denote the period length of the radar signal detection and the H/2 DFS measurement, $T_P$ denotes the period length of the radar signal and $L_P$ denotes a radar pulse width.

Taking into account typical interval lengths and typical period lengths of a radar signal and a DFS measurement, the detection of a radar signal is not reliable enough.

There exists, therefore, a need for a method of controlling frequency selection within a wireless communication system in response to radar-like interference signals which allows to implement a highly effective detection strategy. There is also a need for a wireless communication system which performs such a detection strategy.

BRIEF SUMMARY

The existing need is satisfied by a method of controlling frequency selection within a wireless communication system in response to radar-like interference signals which comprises continuously or quasi-continuously monitoring and assessing one or more frequencies with respect to radar-like interference signals, allocating a quality parameter to each assessed frequency, the quality parameter indicating a probability that a frequency is occupied by a radar like interference signal, and selecting one or more transmission frequencies in dependence on the allocated quality parameters. Additionally, a further monitoring of one or more frequencies with respect to the radar-like interference signals is performed.

The monitoring of the frequencies is either performed continuously or quasi-continuously to enable a quicker and more reliable detection of radar-like interference signals. A quasi-continuous monitoring comprises a plurality of measurement intervals, wherein the duration of a single measurement interval is long compared to the time interval between two subsequent measurement intervals. The monitoring is performed in order to detect any interference signal present at a specific frequency. A detected interference signal may subsequently be assessed with respect to the question if the detected interference signal is radar-like or not.

Radar-like signals are signals which with a high probability go back to a radar system. Typical radar characteristics which may be taken into account when assessing the one or more frequencies are a rotating antenna (approximately 4-20 s, preferably 10 s/360 degree) with a small main lobe (approximately 1 degree), periodic transmission of short pulses (20 to 4000 pulses/s, in particular 2000 to 3000 pulses/s, each pulse having a pulse length of 0,05 to 100 µs, in particular of approximately one µs) and high transmit powers in the order of 26 dBW to 100 dBW. Also, tracking radars are in use which have similar characteristics but do not use a periodically rotating antenna.

Based on the assessment, a quality parameter is allocated to each assessed frequency. The quality parameter may take any value of a preferably predefined set or range of quality parameters. According to a preferred embodiment, the quality parameter comprises more detailed information than a simple yes/no answer. Thus the quality parameter may advantageously assume more than two values. According to one option, the quality parameter can assume a plurality of discrete values, e.g. exactly three pre-defined values. The first value indicates that the frequency is occupied because e.g. a radar-like interference signal has been detected. The second value indicates that the frequency is not occupied because e.g.

no interference signal could be detected. The third value indicates that the frequency might be occupied because e.g. an interference signal has been detected but it is unclear if the detected interference signal is actually radar-like.

According to a second option, the quality parameter can be defined such that it may assume any value between a low quality border value and a high quality border value. The use of a quality parameter which can assume any value comprised within a predefined and continuous range of values is advantageous because it allows a smooth adaption of e.g. subsequent monitoring steps. The selection of one or more frequencies in dependence on the allocated quality parameters can be performed by means of assessing whether the quality parameter allocated to a specific frequency satisfies a threshold condition.

The continuous or quasi-continuous monitoring and assessing of the plurality of frequencies may take place during normal operation, i.e. concurrently with regular transmission, or prior to normal operation, e.g. during a pre-defined start-up mode. If the monitoring and assessing takes place during a normal transmission mode of the wireless communication system, the system may comprise a separate monitoring device for monitoring the plurality of frequencies with respect to the radar-like interference signals. The monitoring device preferably also performs assessing of the monitored frequencies. Moreover, the monitoring device may be adapted to allocate a quality parameter to each assessed frequency. The monitoring device may be part of at least one of an AP or a CC. Alternatively, the monitoring device may be located remote from but in communication with the AP or the CC.

The quality parameters generated within the AP or the CC by means of an internal monitoring device or by means of a software solution can be communicated to further APs or CCs. These further APs or CCs may belong to the same wireless communication system as the component which allocated the quality parameters or to a neighboring wireless communication system. Based on the one or more received quality parameters the receiving AP or CC may select its own frequencies.

The frequencies are selected in dependence on the allocated quality parameters. The selected frequencies may then be subjected to further monitoring. Generally, the further monitoring may relate to at least one of radar-like interference signals and other interference signals. If such interference signals are detected, an additional continuous or quasi-continuous monitoring can be initiated in order to again assess one or more frequencies with respect to the radar-like interference signals and to subsequently allocate corresponding quality parameters to the assessed frequencies. During regular operation at least one of receive and transmit pauses may be artificially created.

Alternatively or additionally, the further monitoring can be performed in accordance with DFS and/or be used for transmission purposes. The further monitoring may thus relate to e.g. non-radar-like interference signals or to an assessment of the average quality of the previously selected frequencies, e.g. with respect to the system traffic load or the transmission quality of the currently used transmission frequency. Preferably, the further monitoring comprises periodical short measurements as depicted in FIG. 1 which are generally not suited for radar detection.

It has been mentioned above that the continuous or quasi-continuous monitoring for assessing a plurality of frequencies with respect to radar-like interference signals can be performed during a start-up mode of the wireless communication system prior to a normal transmission mode thereof. Such a start-up mode may comprise selecting the frequencies having a high quality parameter. In a second selection step, which may e.g. comprise DFS, the frequency having the best transmission quality can be selected for transmission purposes. Preferably, transmission is initiated a randomly selected period of time after the periodic monitoring of the selected frequency has started. This allows some APs to measure the interference of neighboring APs e.g. by means of DFS and to react, if necessary, by selecting another frequency. DFS may be enabled prior to, concurrently with or after start of transmission.

Transmission preferably starts in a non-regular transmission mode in order to allow APs or CCs to react on interference with neighboring APs or CCs. Therefore, the normal transmission mode may not be initiated prior to a predefined or a randomly selected period of time after start of the non-regular transmission mode. The start-up mode ends as soon as the H/2 system switches from the non-regular transmission mode to the normal transmission mode.

A predefined period of time after the normal transmission mode has started, the selected transmission frequencies may again be continuously or quasi-continuously monitored and assessed with respect to radar-like signals or other interference signals. The predefined period of time may be different for different transmission frequencies. Preferably, the predefined period of time is selected in dependence on the quality parameter which has previously been allocated to the current transmission frequency. However, the system traffic load or the transmission quality of the currently used transmission frequency may additionally be taken into account.

The method is applied each time the wireless communication system intends to change from a first transmission frequency to a second transmission frequency. Prior to switching to the second transmission frequency, the second transmission frequency is subjected to the continuous or quasi-continuous monitoring and assessing. Then, a quality parameter is allocated to the assessed second frequency. The second frequency is selected as transmission frequency in dependence on the allocated quality parameter. Subsequently, the second transmission frequency may be subjected to further monitoring with respect to radar-like or other interference signals.

The method outlined above may be implemented by means of a computer program product comprising program code portions for performing individual steps of the method when the product is run on a computer. The computer program product may be stored on a computer readable storage medium.

Also, the method may be implemented by means of a wireless communication system comprising a unit for continuously or quasi-continuously monitoring and assessing one or more frequencies with respect to the radar-like interference signals, a unit for allocating a quality parameter to each assessed frequency, the quality parameter indicating a probability that the frequency is occupied and a unit for selecting one or more frequencies in dependence on the allocated quality parameters.

The system may further comprise a unit for further monitoring one or more of the frequencies with respect to at least one of the radar-like interference signals and other interference signals. The unit for further monitoring may be identical with the unit for continuously or quasi-continuously monitoring the plurality of frequencies. Preferably, at least some of the units of the wireless communication system outlined above are comprised within a monitoring device which is associated with or remote from at least one of an AP or a CC.

BRIEF DESCRIPTION OF THE DRAWINGS

Further advantage of the invention will become apparent from the following description of preferred embodiments of the invention in the light of the accompanying drawings, in which.

DESCRIPTION OF PREFERRED EMBODIMENTS

The invention can be applied to all kinds of wireless communication systems. In the following, the invention is exemplarily described with focus on a H/2 and a IEEE 802.11a/h system.

Figure 2:
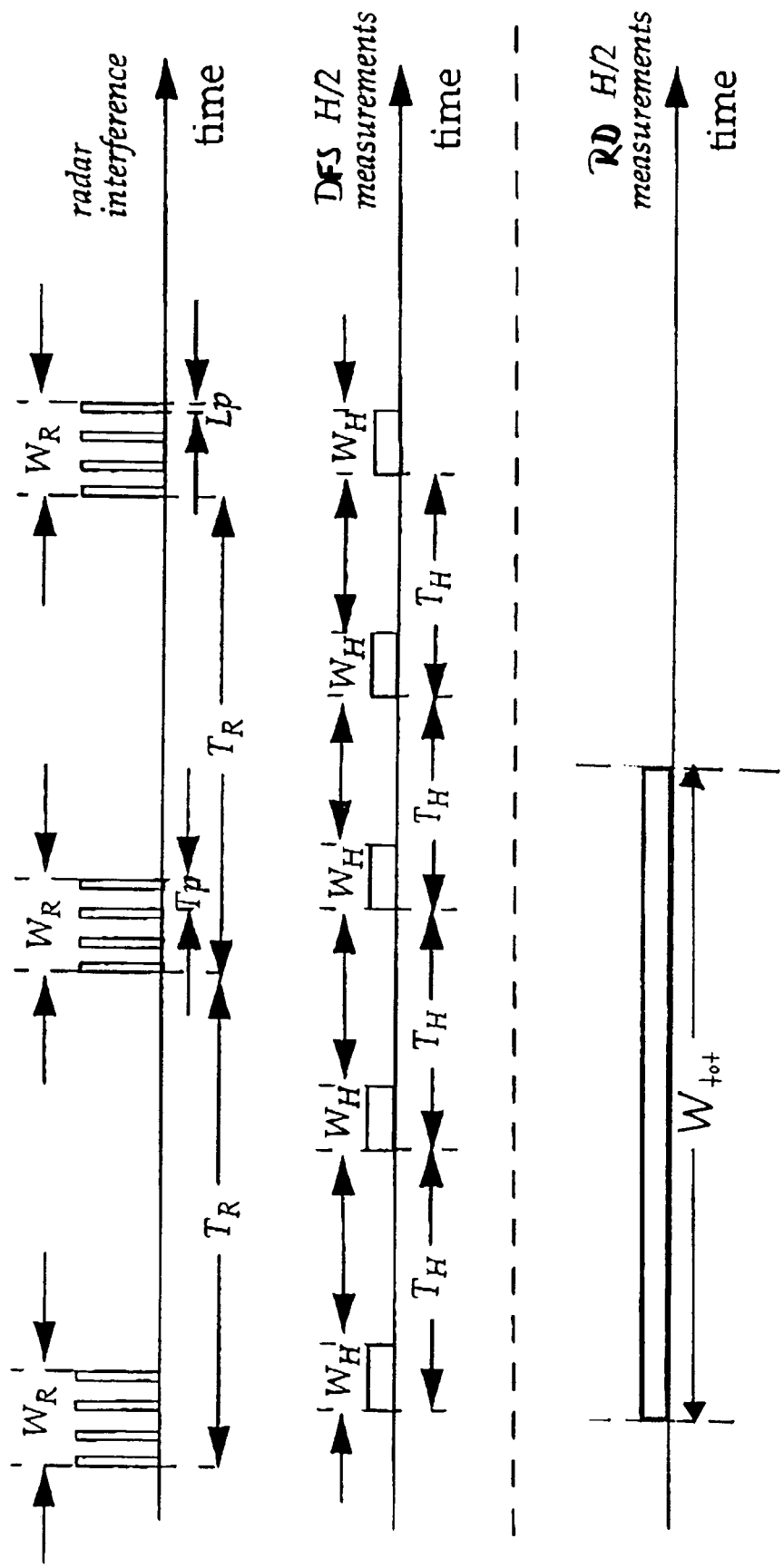
FIG. 2 shows a monitoring strategy of a H/2 system.

In the lower half of FIG. 2 a continuous monitoring strategy for radar detection (RD) in a H/2 or IEEE 802.11a/h system is illustrated. As can be seen, the continuous monitoring consists of a single measurement having an interval length $W_{tot}$ which is large compared to interval lengths of the DFS measurements. $W_{tot}$ is chosen such that it is ensured that at least one periodical radar pulse is received. Typical radar periods are 10 seconds. Thus, $W_{tot}$ should have an extension in the time direction of at least 10 seconds. In order to identify a detected interference signal as periodic interference signal it is advantageous to choose $W_{tot}$ such that at least two and preferably three or more radar pulses can be received. This would enable the H/2 or IEEE 802.11a/h system to make a more reliable distinction between periodic radar-like interference signals and other, non-periodic radar-like interference signals like e.g. interference signals from a tracking radar which will usually be non-periodic.

After a monitoring as depicted in FIG. 2 has been performed for an individual frequency, the result of the monitoring has to be assessed in order to allocate a quality parameter to this frequency.

As a first example, a limited set of quality parameters indicating the probability with which a frequency is occupied can be provided. A first quality parameter (1) indicates that the respective frequency is occupied by radar because a periodic interference signal has been detected. A second quality parameter (0) indicates that the respective frequency is not occupied by radar because neither a periodic nor a non-periodic interference signal has been detected. A third quality parameter (?) indicates that there exists a probability greater than zero that the respective frequency is occupied by radar because e.g. an interference signal has been detected, but it is unclear if the detected interference signal is actually periodic.

Frequencies marked by (0) may subsequently be used as transmission frequencies for the H/2 or IEEE 802.11a/h system. Frequencies marked by (1) or (?) on the other hand may not be allowed to be used. Regardless of the quality parameter allocated to a frequency, the monitoring of all frequencies may subsequently be periodically repeated such that the measurement periods are adapted to the reliability of the allocated quality parameters. Thus, frequencies marked with (?) may be more often monitored than frequencies marked with (0) or (1). Alternatively or additionally, the monitoring period can also be adapted to the overall transmission quality within a specific cell.

Instead of defining a discrete set of quality parameters, a more general aspect assigns each frequency f a certain probability P(f). P(f) lies between a low quality border value P1 and a high quality border value P0. P1 and P0 may be adjustable. The introduction of a continuous quality parameter P(f) allows a more detailed assessment whether a frequency is occupied or not.

As an example, P0 may be chosen to equal 0 (no radar-like signal has been detected) and the value of P1 may be chosen to equal 1 (one or more radar-like signals have been detected). A threshold value may be defined to equal 0.1. For each frequency $f_i$ to be assessed, a corresponding quality parameter $P(f_i)$ is generated and allocated to the frequency $f_i$. If the quality parameter $P(f_i)$ of the frequency $f_i$ lies below the threshold value of 0.1, the frequency $f_i$ may subsequently be selected for further monitoring and/or transmission purposes. If, on the other hand, the quality parameter $P(f_i)$ for a specific frequency $f_i$ lies above this threshold value, the frequency $f_i$ is not selected.

Once a quality parameter $P(f_i)$ has been allocated to a frequency $f_i$, the frequency $f_i$ may subsequently be subjected to additional periodic measurements. Preferably, the periodicity of the additional measurements is chosen in dependence on the reliability of the quality parameter P(f). This means that many measurements are performed if P(f) has a value of approximately 0.5 and few measurements are performed if P(f) lies in the vicinity of 0 or 1.

The use of P(f) allows a smoother adaption of the monitoring period to the actual interference conditions. The detection of interference signals and the assessment of frequencies with respect to the detected interference signals may be implemented such that the H/2 or IEEE 802.11a/h system searches for small, periodically received pulses. A received pulse may qualify as interference signal if the respective signal level is higher than a certain threshold. Further parameters like the spectrum of the expected radar signal or statistics of other interferences like co-channel interference with higher variance than radar can also be taken into account in order to analyze a specific frequency with respect to radar-like signals.

In order to analyze the detected interference signals for the purpose of allocating the quality parameters, the following strategy can be used. During a monitoring period $W_{tot}$ a number of N RSS (Received Signal Strength) samples are taken. If no RSS sample is above a certain signal threshold which is typical for radar, the frequency is assumed to be not occupied by radar. If at least one RSS sample is above this threshold, this high field strength RSS sample could result from a radar-like signal or any other interference like co-channel interference. It must then be checked if some statistics of the RSS samples like variance, occupied bandwidth, etc. are typical for co-channel interference or radar. Based on this investigation, the channel is finally marked as likely to be used by radar or not. As pointed out above, this probability can be expresses by P(f) or by one of the markers (0), (1) or (?).

Figure 3:
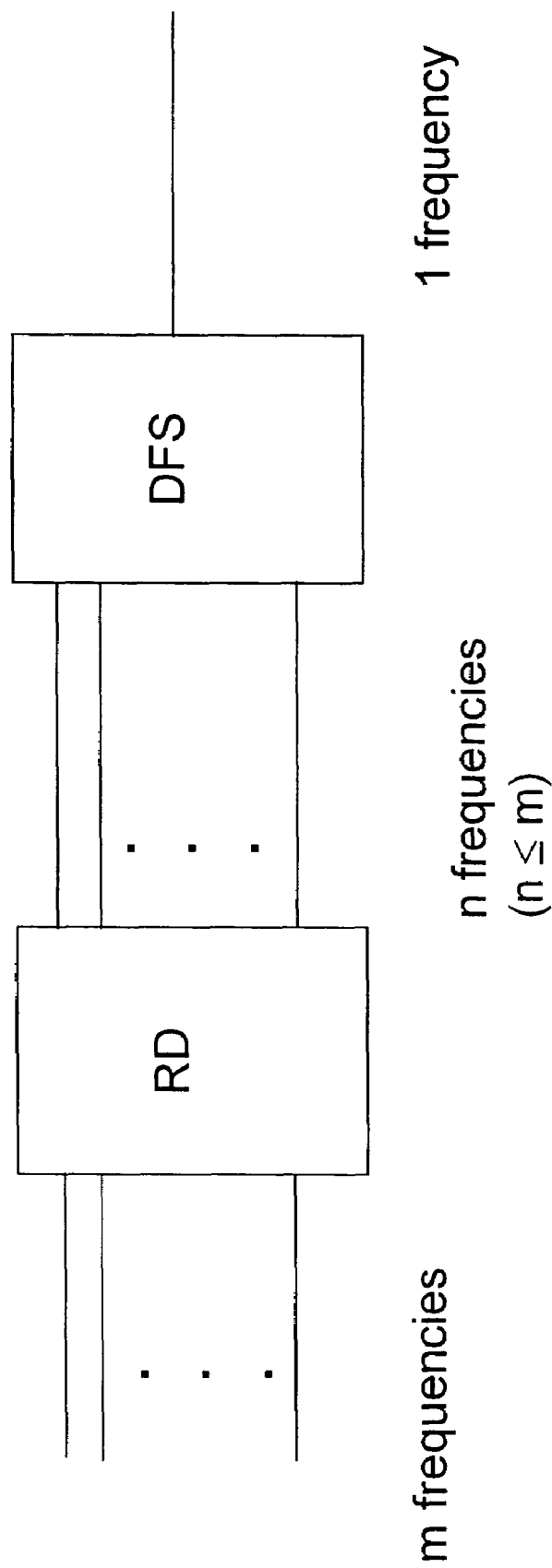
FIG. 3 shows a possible implementation of radar detection and dynamic frequency selection in a H/2 system.

In FIG. 3 a possible implementation within a H/2 or IEEE 802.11a/h system comprising a radar detection unit RD and a dynamic frequency selection unit DFS is illustrated. The radar detection unit RD performs a continuous or quasi-continuous monitoring with respect to radar-like signals and the dynamic frequency selection unit DFS performs a short-term monitoring with respect to other interference signals resulting from e.g. neighboring systems. Possible measurement strategies for radar detection and dynamic frequency selection are exemplarily illustrated in FIG. 2.

The radar detection unit RD receives a number of m frequencies to be assessed with respect to radar-like signals. The frequencies assessed by the radar detection unit RD can be constituted by a whole frequency band or by a set of frequencies which were allocated to an individual support provider. Within the radar detection unit RD, a quality parameter $P(f_i)$ is allocated to each frequency $f_i$ assessed by the radar detection unit RD. Within the radar detection unit RD a first selection takes place and a number of n (n≦m) frequencies having a quality parameter P(f) which satisfies a certain threshold condition is input to the dynamic frequency selection unit DFS. The dynamic frequency selection unit DFS assesses the received frequencies with respect to e.g. an average transmission quality and performs a second selection with respect to the frequency being best suited for transmission purposes. This single frequency is subsequently output by the dynamic frequency selection unit DFS and used for transmission purposes.

The method of controlling frequency selection within a H/2 system according to the invention can be implemented during a normal transmission mode of the H/2 or IEEE 802.11a/h system or during a special start-up mode thereof, i.e. prior to normal transmission. In the following, an exemplary four-step start-up mode is illustrated.

Figure 1:
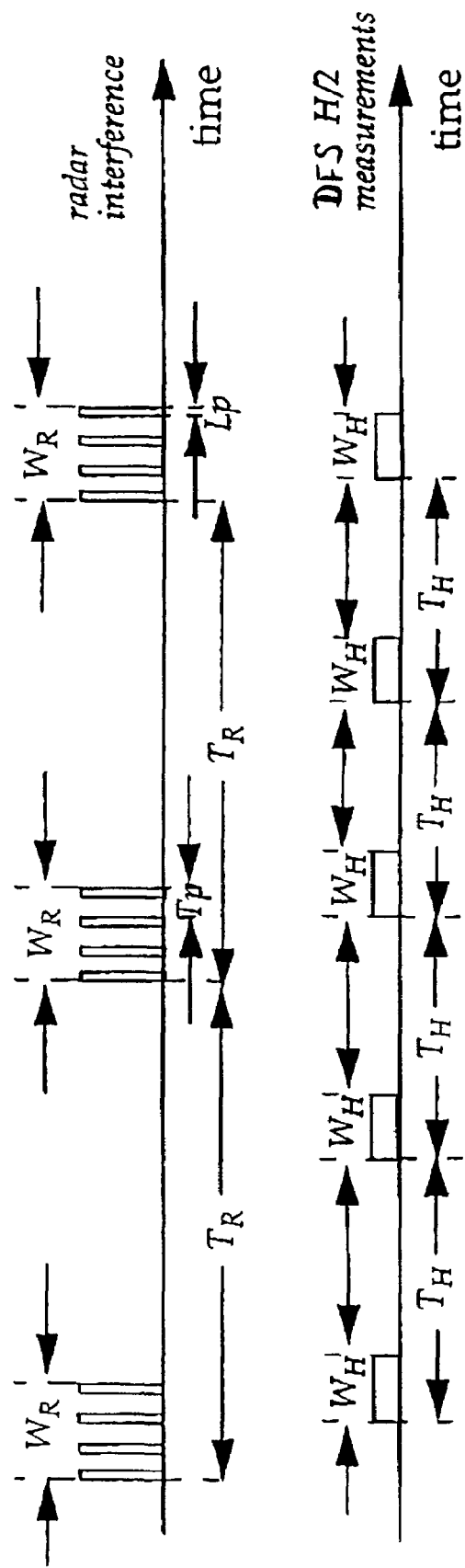
FIG. 1 shows a possible realization of a monitoring strategy of a H/2 system.

During a first step the frequencies are monitored and assessed with respect to radar-like interference signals. In a second and a third step DFS as depicted in FIG. 1 takes place. In a fourth step the H/2 or IEEE 802.11a/h system is switched to a normal mode of operation. A further step can optionally be defined such that monitoring similar to the first step is periodically repeated every few hours. In the following, the individual steps are discussed in more detail.

Figure 8:
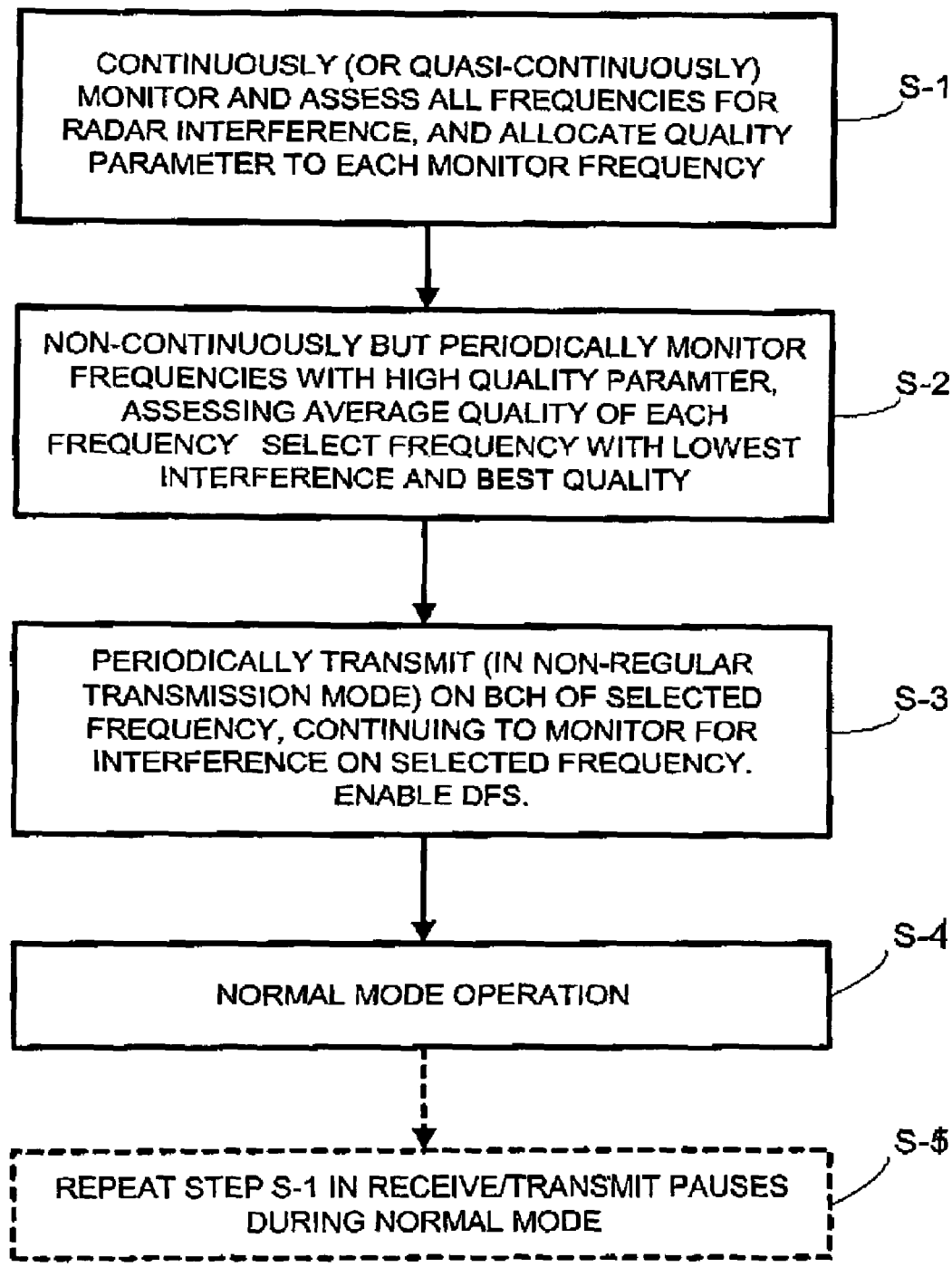
FIG. 8 shows a flowchart including steps according to an example method of controlling frequency selection in response to radar-like interference signals.

Step S-1 of the start-up mode (see FIG. 8) is automatically initiated when an AP (H/2, IEEE 802.11a/h) or a CC (IEEE 802.11a/h) is switched on. During step S-1 no transmission takes place and all frequencies of e.g. the upper frequency band of H/2 are continuously or quasi-continuously monitored and assessed with regard to the result of the monitoring. The monitoring duration depends on the expected period $T_R$ of the radar interference. Then, a quality parameter is allocated to each monitored frequency. The measurement on one frequency is immediately aborted as soon as an interfering periodic radar signal has been detected on that frequency with a certain probability. Thus, the start-up time may be reduced. step S-1 may be performed by the radar detection unit RD depicted in FIG. 3.

After all frequencies have been monitored once, the AP continues with step S-2. Step S-2 may be performed by the dynamic frequency selection unit DFS depicted in FIG. 3.

During step S-2, all channels to which a high quality parameter has been allocated (e.g. (0) or a value of P(f) satisfying a predefined threshold condition) are non-continuously but periodically measured. By means of the periodic measurements the average quality of each frequency can be assessed. Since the periodic measurements are very short, periodic interference signals can normally not be detected. The duration $T_2$ of step S-2 is randomly selected within a predefined range of time. By means of the randomly selected duration $T_2$ it is avoided that several APs or CCs, which have been switched on at the same time, switch synchronously from step S-2 to step S-3. After $T_2$ has lapsed, the AP or CC automatically selects the frequency with the lowest interference and best quality. The AP or CC then switches to step S-3.

In step S-3 the AP or CC periodically transmits in a non-regular transmission mode the BCH (Broadcast Channel , H/2) or beacon (IEEE 802.11a/h) on the frequency selected in step S-2. Any other transmission within the H/2 or IEEE 802.11a/h system is suppressed. No MT is allowed to associate to the AP or CC and to communicate with it. In the remaining part of the MAC(Medium Access Control)-frame between the BCH or beacon transmissions, the AP or CC continues to monitor the interference on the frequency selected in step S-2 and on the other frequencies. Like in step S-2, the monitoring is generally too short for detecting periodic interference signals.

In step S-3 DFS is enabled. This means that when the interference on the frequency selected during step S-2 increases and gets higher than for another frequency, the AP or CC automatically switches to the next best frequency with the lowest interference. The switching takes into account a predefined hysteresis to avoid too fast toggling between frequencies with similar or almost similar interference.

The duration $T_3$ of step S-3 is preferably fixed. Alternatively, it can be randomly selected within a predefined range of time. After $T_3$ has lapsed, the AP or CC automatically switches to step S-4. Now the advantage of the random duration $T_2$ of step S-2 becomes apparent. Since the APs or CCs do not simultaneously switch to step S-3, when non-regular transmission is started some APs or CCs can measure the interference from the BCH or beacon transmission of neighboring APs or CCs and may react by selecting a different transmission frequency . From step S-3 the start-up mode continues with step S-4.

Step S-4 corresponds to the normal mode of operation. The APs or CCs continue transmitting the BCH or beacon and allow the association of MTs and the communication with them. DFS remains enabled.

According to an optional further step, e.g., step S-5 (shown as optional by broken lines in FIG. 8), step S-1 is repeated in receive/transmit pauses during the normal mode of operation of the H/2 or IEEE 802.11a/h system. Again , a plurality of frequencies is continuously or quasi-continuously monitored. The repetition interval of the monitoring can be chosen in dependence on the system traffic load and/or the quality parameter previously allocated to the transmission frequency or other frequencies Instead of or additionally to implementing the method of the invention in the form of a start-up mode, the method may also be applied during regular operation of a H/2 or IEEE 802.11a/h system such that the method is performed each time a new frequency is selected by an AP or a CC. This means that every time a new frequency is selected (e.g. in accordance with DFS), this newly selected frequency is monitored and assessed and a quality parameter is allocated to this newly selected frequency. A continuous or quasi-continuous monitoring with a comparatively long monitoring duration (corresponding to $W_{tot}$) is used as previously described. The same measurement and decision procedure as illustrated above with respect to step S-1 of the start-up mode can be employed.

When it is decided that the new frequency is already occupied by radar, this frequency is marked with the corresponding quality parameter and will subsequently be avoided by the H/2 or IEEE 802.11a/h system. Thereafter, another frequency is selected out of a list of allowed frequencies, e.g. frequencies to which appropriate quality parameters have been allocated. The selection among the list of allowed frequencies may be performed in accordance with DFS as depicted in FIGS. 1 and 2. The allowed frequencies may be ranked based on DFS co-channel interference measurements. The aspect of performing the inventive method prior to switching to a new frequency may advantageously be combined with the start-up mode described above.

During regular operation of a H/2 or IEEE 802.11a/h system, i.e. during regular transmission, receive/transmit pauses can be artificially created in dependence on e.g. a system traffic load and/or the quality parameter allocated to the transmission frequency. During the artificially created receive/transmit pauses further radio detection can be performed. The radio detection performed during the receive/transmit pauses is preferably only performed with respect to the current transmission frequency. The duration of the receive/transmit pauses should not exceed several milliseconds in order to maintain a high transmission capability of the H/2 or IEEE 802.11a/h system.

Once an AP or a CC has determined the quality parameters of one or more frequencies, the determined quality parameters may be communicated to neighboring APs or CCs of the same or to APs and CCs of a neighboring system. This additional information can be used by the respective AP or CC for a more definite decision if a certain frequency is occupied by radar or not. Also, it would generally be sufficient to provide only a single AP or a single CC within a specific system with the capability to perform the invention.

The methods outlined above can be implemented in the firmware of APs or CCs. Thus, no additional hardware for carrying out the invention is required. Alternatively, a separate monitoring device operated as radar detection unit can be included within or attached to an AP or a CC. The monitoring device has the task of monitoring one or more frequencies in order to detect periodic interference signals resulting from a radar system. Additionally, the monitoring device may comprise appropriate functionalities for assessing the frequencies with respect to detected interference signals and for allocating a corresponding quality parameter to each assessed frequency. Several realizations of a H/2 or IEEE 802.11a/h system comprising such a monitoring device are depicted in FIGS. 4 to 7.

Figure 4:
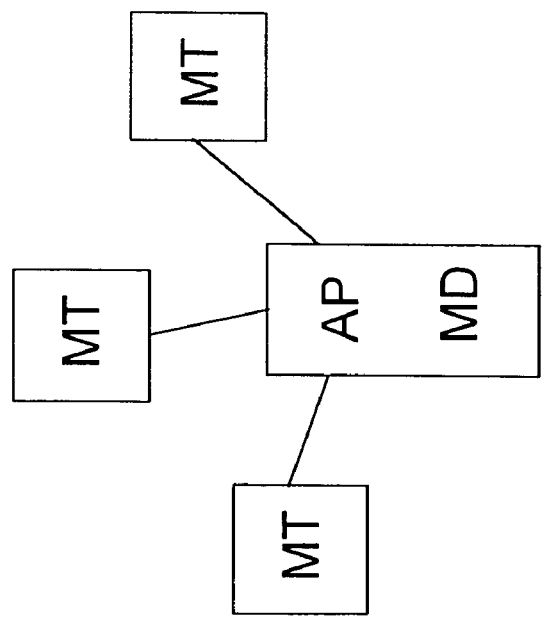
FIG. 4 shows a first embodiment of a H/2 system.

A first embodiment of a H/2 or IEEE 802.11a/h system comprising a monitoring device MD is depicted in FIG. 4. The system comprises three MTs and a single AP. The monitoring device MD is included as a software solution within the AP. Such an included monitoring device MD has the disadvantage that it cannot measure when the AP transmits. This means that the monitoring cannot be continuously or quasi-continuously performed during regular transmission of the AP.

Figure 5:
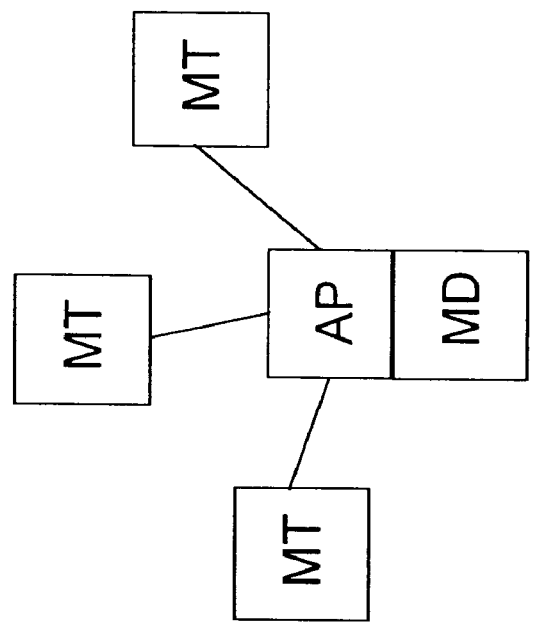
FIG. 5 shows a second embodiment of a H/2 system.

According to the system depicted in FIG. 5, the monitoring device MD is attached as a hardware solution to the AP. The monitoring device MD can be connected to the AP by means of a wired or wireless connection. For example, a radio connection can be provided by means of a separate radio interface (e.g. Bluetooth) or by means of the H/2 or IEEE 802.11a/h air interface already specified for the MT/AP or the MT/CC communication.

Figure 6:
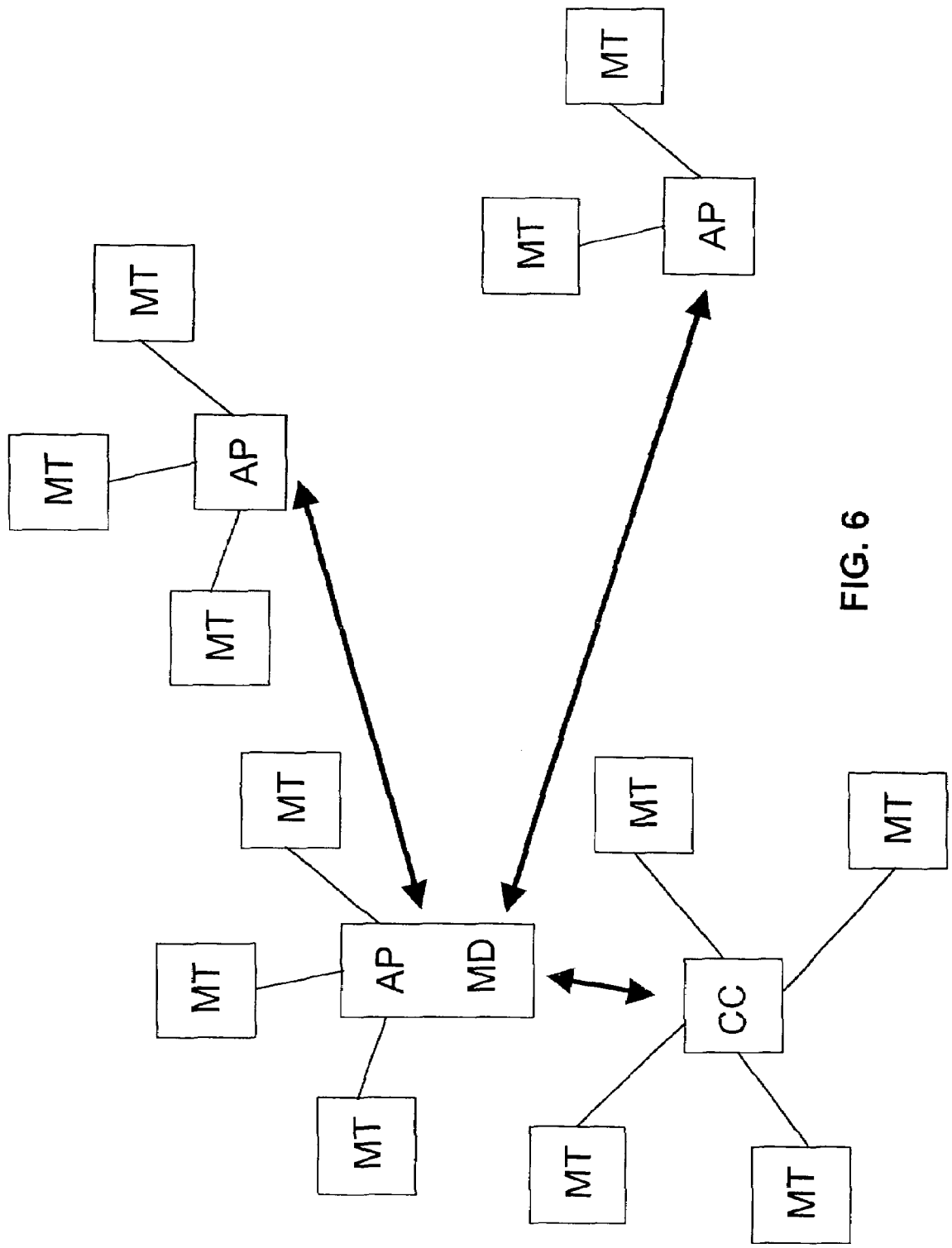
FIG. 6 shows a third embodiment of a H/2 system.

A third embodiment of a H/2 or IEEE 802.11a/h system comprising a monitoring device MD is depicted in FIG. 6. The system depicted in FIG. 6 comprises four separate cells. A first cell is defined by an AP comprising a monitoring device MD as depicted in FIG. 4. A second and a third cell are defined by APs without monitoring device MD. A fourth cell is defined by a CC.

The individual quality parameters allocated to specific frequencies are communicated from the AP, to which the monitoring device MD is associated, to the three neighboring cells. Thus, the three neighboring cells can profit from the monitoring and assessing performed within the AP in communication with the monitoring device MD. The individual cells may be connected by means of a radio connection.

Figure 7:
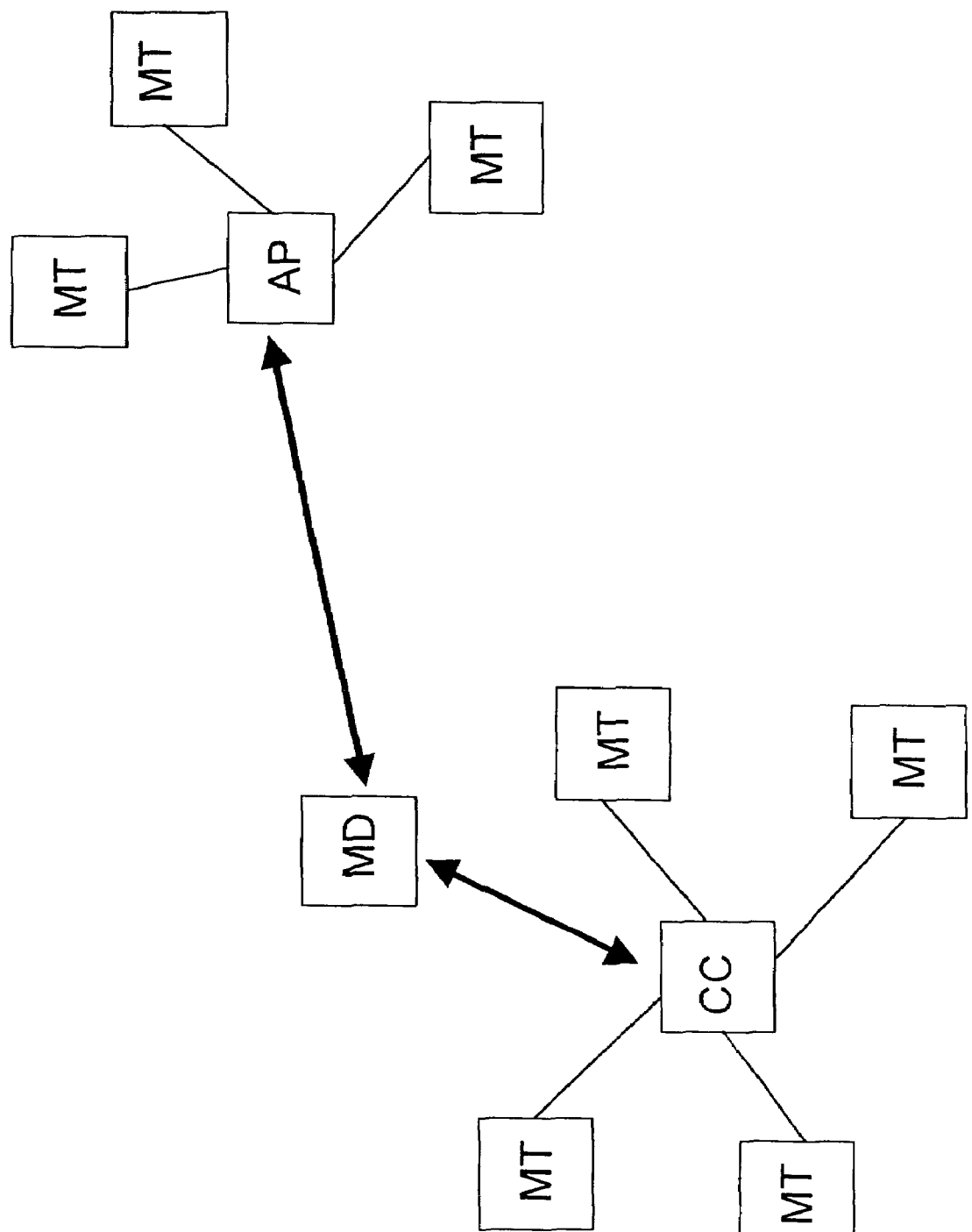
FIG. 7 shows a fourth embodiment of a H/2 system.

In FIG. 7, a fourth embodiment of a H/2 or IEEE 802.11a/h system according to he invention is illustrated. The system depicted in FIG. 7 comprises a monitoring device MD which is arranged a certain distance away from an AP cell and a CC cell. The monitoring device MD communicates with the AP and the CC by means e.g. of a radio connection or a wired link. Since the monitoring device MD is spaced apart from the AP and the CC, the monitoring device MD can perform continuous or quasi-continuous monitoring during transmission of the AP or the CC. This allows a more reliable detection of radar signals during the normal mode of operation of a H/2 or IEEE 802.11a/h system.

The invention claimed is:

1. A method of controlling frequency selection in a wireless communication system, the method comprising:
   a) assessing plural frequencies with respect to a radar interference signal;
   b) allocating a quality parameter to each assessed frequency, the allocated quality parameter being selected from more than two values used to express the quality parameter allocated to the assessed frequency, the quality parameter indicating a probability that the frequency is occupied by the radar interference signal;
   c) selecting one or more of the plural frequencies in dependence on the allocated quality parameters for use by the wireless communication system; and
   d) further assessing one or more of the plural frequencies with respect to a radar interference signal, wherein measurement for each assessed frequency is adapted to the quality parameter value allocated to the respective frequency;
   wherein acts a) through d) are performed by a processor.

2. The method of claim 1,
   wherein the quality parameter can assume one of a plurality of pre-defined values, a first value indicating that a frequency is occupied, a second value indicating that a frequency is not occupied, and a third value indicating that a frequency might be occupied.

3. The method according to claim 1,
   wherein the quality parameter can assume any value between a lower quality border value and an upper quality border value.

4. The method according to claim 1,
   wherein in act c) only those frequencies are selected to which quality parameters satisfying a threshold condition are allocated.

5. The method according to claim 1,
   wherein at least act a) is performed during a normal transmission mode.

6. The method according to claim 1,
   wherein at least act a) is performed prior to a normal transmission mode.

7. The method of claim 1,
   wherein at least act a) is performed by a separate monitoring device in communication with at least one of an access point and a central controller (CC) of the wireless communication system.

8. The method of claim 1,
   further comprising communicating the allocated quality parameters to an access point or a central controller of the same or a neighboring wireless communication system.

9. The method of claim 1, wherein, if at least one of the radar interference signal or other interference signals is detected in act d), repeating acts a) to c).

10. The method to claim 1, wherein during regular operation receive/transmit pauses are artificially created.

11. The method of claim 1, wherein act d) comprises periodically monitoring one or more of the selected frequencies to assess an average quality thereof.

12. The method of claim 11, further comprising transmitting on the one or more frequencies having the highest average quality.

13. The method of claim 12, wherein after a predefined period of time the method returns to act a).

14. The method of claim 13, wherein for a specific transmission frequency the predefined period of time is selected in dependence on the quality parameter previously allocated to this transmission frequency.

15. The method of claim 13, wherein the predefined period of time is selected additionally in dependence on a system traffic load or the transmission quality of the currently used transmission frequency.

16. The method of claim 1, wherein prior to switching from a first transmission frequency to a second transmission frequency, the second transmission frequency is subjected to at least acts a) and b).

17. The method of claim 1, further comprising performing act a) for a time period that corresponds to at least one typical radar pulse period.

18. The method of claim 1, further comprising performing act a) for a time period of substantially ten seconds.

19. The method of claim 1, further comprising performing act a) for a time period of from approximately four seconds to approximately twenty seconds.

20. The method of claim 1, wherein the system is a High Performance Radio Local Area Network.

21. The method of claim 1, wherein the system is an IEEE 802.11a/h system.

22. The method of claim 1, further comprising further assessing the one or more of the plural frequencies selected in act c) with respect to transmission quality.

23. A computer readable medium storing a computer program executable by a processor for performing the acts of:
a) assessing plural frequencies in a wireless communication system with respect to a radar interference signal;
b) allocating a quality parameter to each assessed frequency, the allocated quality parameter being selected from more than two values used to express the quality parameter allocated to the assessed frequency, the quality parameter indicating a probability that the frequency is occupied by the radar interference signal;
c) selecting one or more of the plural frequencies in dependence on the allocated quality parameters for use by the wireless communication system; and
d) further assessing one or more of the plural frequencies with respect to a radar interference signal, wherein measurement for each assessed frequency is adapted to the quality parameter value allocated to the respective frequency.

24. The computer program product of claim 23, stored on a computer readable recording medium.

25. The computer program product of claim 23 which further performs the act of further assessing the one or more of the plural frequencies selected in act c) with respect to transmission quality.

26. A wireless communication system comprising:
a) a first unit configured to assess plural frequencies with respect to a radar interference signal;
b) a second unit configured to allocate a quality parameter to each assessed frequency, the allocated quality parameter being selected from more than two values used to express the quality parameter allocated to the assessed frequency, the quality parameter indicating a probability that the frequency is occupied by the radar interference signal;
c) a third unit configured to select one or more of the plural frequencies in dependence on the allocated quality parameters for use by the wireless communication system; and
d) a fourth unit configured to assess further one or more of the plural frequencies with respect to a radar interference signal, wherein measurement for each assessed frequency is adapted to the quality parameter value allocated to the respective frequency.

27. The wireless communication system of claim 26, comprising a monitoring device (MD) associated with or remote from at least one of an access point (AP) or a central controller (CC), wherein the monitoring device (MD) includes at least the first unit.

28. The system of claim 26, wherein the fourth unit is further configured to assess the one or more of the plural frequencies selected by the third unit with respect to transmission quality.

* * * * *

UNITED STATES PATENT AND TRADEMARK OFFICE
CERTIFICATE OF CORRECTION

| | | |
|---|---|---|
| PATENT NO. | : 7,496,368 B2 | Page 1 of 1 |
| APPLICATION NO. | : 10/674791 | |
| DATED | : February 24, 2009 | |
| INVENTOR(S) | : Zimmermann et al. | |

It is certified that error appears in the above-identified patent and that said Letters Patent is hereby corrected as shown below:

Title page, item [75] should read as follows:

Lennart Gafvels, Solna (SE); Göran Malmgren, Huddinge (SE)

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,496,368 B2 | Page 1 of 1 |
| APPLICATION NO. | : 10/674791 | |
| DATED | : February 24, 2009 | |
| INVENTOR(S) | : Zimmermann et al. | |

It is certified that error appears in the above-identified patent and that said Letters Patent is hereby corrected as shown below:

On the Title page, Assignee Item (73) should read as follows:

(73) Assignee: Telefonaktiebolaget LM Ericsson (publ), Stockholm (SE)

Signed and Sealed this
Fourth Day of June, 2013

Teresa Stanek Rea
*Acting Director of the United States Patent and Trademark Office*